United States Patent
Sherman et al.

(10) Patent No.: US 11,956,162 B2
(45) Date of Patent: *Apr. 9, 2024

(54) ASYNCHRONOUS MEDIUM ACCESS CONTROL LAYER SCHEDULER FOR DIRECTIONAL NETWORKS

(71) Applicant: BAE Systems Information and Electronic Systems Integration Inc., Nashua, NH (US)

(72) Inventors: Matthew J. Sherman, Succasunna, NJ (US); Mark D. Chauvette, Morristown, NJ (US); Matthew Rasa, Wayne, NJ (US); Nicholas C. Sherman, Succasunna, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,418

(22) Filed: Feb. 15, 2023

(65) Prior Publication Data

US 2023/0198915 A1 Jun. 22, 2023

Related U.S. Application Data

(63) Continuation of application No. 16/539,661, filed on Aug. 13, 2019, now Pat. No. 11,621,925.

(60) Provisional application No. 62/718,033, filed on Aug. 13, 2018.

(51) Int. Cl.
*H04L 47/72* (2022.01)
*H04L 7/00* (2006.01)
*H04L 41/5003* (2022.01)
*H04L 47/56* (2022.01)
(Continued)

(52) U.S. Cl.
CPC ............ *H04L 47/72* (2013.01); *H04L 7/0008* (2013.01); *H04L 41/5003* (2013.01); *H04L 47/56* (2013.01); *H04W 48/16* (2013.01); *H04W 72/0446* (2013.01)

(58) Field of Classification Search
None
See application file for complete search history.

(56) References Cited

U.S. PATENT DOCUMENTS 5,590,131 A * 12/1996 Kabatepe ............ H04L 12/2801
370/461
6,154,456 A * 11/2000 Rakib ...................... H04J 13/16
370/479

(Continued)

*Primary Examiner* — Hassan A Phillips
*Assistant Examiner* — Gautam Sharma
(74) *Attorney, Agent, or Firm* — Scott J. Asmus; Sand, Sebolt & Wernow LPA (57) ABSTRACT

An asynchronous medium access control layer scheduler increases efficiency for directional mesh networks by removing extra overhead in the time slots. The efficiency is increased by dividing time slots into sub-slots to allow for a receiving node to be offset by at least one sub-slot from the transmitting node. This enables the scheduler to more efficiently schedule operations for the nodes so that nodes can be performing other functions rather than waiting to receive a transmission or waiting after transmitting a transmission. The sub-slots may be sized to approximate the transmission propagation time or time of flight delay.

17 Claims, 6 Drawing Sheets

(51) Int. Cl.
*H04W 48/16* (2009.01)
*H04W 72/0446* (2023.01)

(56) References Cited

U.S. PATENT DOCUMENTS

| | | | | |
|---|---|---|---|---|
| 6,449,290 | B1* | 9/2002 | Willars | H04W 56/0015 370/324 |
| 6,594,273 | B1* | 7/2003 | McGibney | H04W 88/04 370/336 |
| 8,248,989 | B2* | 8/2012 | Jeong | H04B 7/2656 370/321 |
| 11,438,856 | B2* | 9/2022 | Pang | H04W 72/044 |
| 11,621,925 | B2* | 4/2023 | Sherman | H04L 47/56 370/503 |
| 2002/0141435 | A1* | 10/2002 | Newberg | H04B 7/2656 370/468 |
| 2004/0081193 | A1* | 4/2004 | Forest | H03M 13/43 370/458 |
| 2005/0243748 | A1* | 11/2005 | Bosch | H04B 7/2618 370/310 |
| 2009/0034491 | A1* | 2/2009 | Adams | H04B 7/2656 370/347 |
| 2012/0182867 | A1* | 7/2012 | Farrag | H04J 3/16 370/230 |
| 2013/0094481 | A1* | 4/2013 | Jeong | H04L 23/02 370/336 |
| 2013/0195082 | A1* | 8/2013 | Wu | H04W 74/0808 370/336 |
| 2016/0112943 | A1* | 4/2016 | Horn | H04W 72/20 370/329 |
| 2018/0359781 | A1* | 12/2018 | Yoon | H04W 16/14 |
| 2019/0104515 | A1* | 4/2019 | Li | H04L 1/1887 |
| 2019/0159238 | A1* | 5/2019 | Kim | H04L 1/1812 |
| 2019/0364592 | A1* | 11/2019 | Bhattad | H04W 74/0808 |
| 2020/0036586 | A1* | 1/2020 | Gao | H04W 74/02 |
| 2020/0077276 | A1* | 3/2020 | Zhu | H04L 5/003 |
| 2020/0187169 | A1* | 6/2020 | Gao | H04L 5/0044 |
| 2021/0105815 | A1* | 4/2021 | Salem | H04W 16/14 |

\* cited by examiner

ASYNCHRONOUS MEDIUM ACCESS CONTROL LAYER SCHEDULER FOR DIRECTIONAL NETWORKS

CROSS REFERENCE TO RELATED APPLICATIONS

This application claims priority and is a continuation of U.S. application Ser. No. 16/539,661, filed on Aug. 13, 2019 and claims the benefit of U.S. Provisional Application Ser. No. 62/718,033, filed on Aug. 13, 2018; the disclosures of which are incorporated herein by reference.

TECHNICAL FIELD

The present disclosure relates generally to transmission schedules between nodes in a network. More particularly, the present disclosure relates to asynchronous transmission schedules between directional antennas in a mesh network. Superficially, the present disclosure provides a practical application to increase efficiency in transmission schedules in directional antennas in a network.

BACKGROUND

Directional networks provide significant promise for future high-bandwidth communications architectures. There is an increasing need for capacity to support multi-media and other bandwidth-intensive applications while spectrum availability is decreasing. Directional networks allow for high capacity communications by focusing the energy between transmitter and receiver and providing greater frequency reuse. These networks can either be radio frequency (RF) or optical (free-space optical communications).

Currently, directional networks utilize transmission and reception schedules in which a transmitter transmits a signal to a receiver during a time slot. The transmitter transmits the signal during the time slot and the receiver "listens" for the signal during the time slot. Each of these respective actions occur during one time period or time slot.

The transmitted signal can take time to travel (i.e., time of flight) from the transmitter to the receiver. However, the receiver is "listening" for the signal during the entire time slot. Thus, the receiver is occupied with a "listening" action before the signal arrives at the receiver, which decreases efficiency as there is a period of time in which the receiver is performing a "listening" function but is producing no results. Further, the transmitter must stop transmitting before the end of the time slot to ensure that all information is received by the receiver within the allotted time frame.

SUMMARY

Thus, a need continues to exist for an improved scheduling device for directional networks to more efficiently utilize a receiver instead of occupying it with a "listening" function that produces no results. The present disclosure improves efficiency by taking into account the time of flight delay between the signal transmission and the signal reception by creating time sub-slots in which the receiver can be performing other actions during the sub-slots occurring prior to the time of flight delay.

In one aspect, an exemplary embodiment of the present disclosure may provide an asynchronous medium access control layer (AMAC) scheduler comprising: at least one time slot including a first time slot, at least two sub-slots within each at least one time slot, a transmit packet block occupying at least one sub-slot within the first time slot, and a receiver packet block including at least one sub-slot independent from the transmit packets block of at least one sub-slot, both the transmit packet block and the receiver packet block occupying at least one sub-slot and the receiver packet block being offset by a non-negative integer value of sub-slots from the transmit packet block from the first time slot and at least one sub-slot from a second time slot that is adapted to free a transceiver during the other sub-slot in the first time slot to perform a different operation. This exemplary embodiment or another exemplary embodiment may further provide a device to account for time of flight (ToF) delays from the sender packet to the receiver packet. This exemplary embodiment or another exemplary embodiment may further provide wherein the receiver performs a different task in a prior sub-slot during the ToF delay before the at least one sub-slot from the first time slot. This exemplary embodiment or another exemplary embodiment may further provide wherein the ToF delay is at least equal to the time of one sub-slot. This exemplary embodiment or another exemplary embodiment may further provide a time slot splitter that splits the first time slot into the at least two sub-slots and splits the second time slot into the at least two sub-slots; wherein the number of sub-slots for the first time slot is in a range from two sub-slots to about twenty sub-slots. This exemplary embodiment or another exemplary embodiment may further provide wherein the number of sub-slots in the first time slot is equal to four. This exemplary embodiment or another exemplary embodiment may further provide a ratio of sub-slots to slots in a range from 2:1 to about 20:1. This exemplary embodiment or another exemplary embodiment may further provide wherein the ratio of sub-slots to slots is 4:1. This exemplary embodiment or another exemplary embodiment may further provide that the AMAC scheduler is in operative communication with a mesh network having a first directional antenna that transmits a packet and a second directional antenna that receives the packet. This exemplary embodiment or another exemplary embodiment may further provide a first fragmented packet block and a second fragmented packet block spaced from the first fragmented packet block by at least one sub-slot.

In another aspect, an exemplary embodiment of the present disclosure may provide a method comprising: dividing a first time slot in a node scheduler into a plurality of sub-slots and a second time slot into a plurality of sub-slots; reserving a transmission block for a first node within at least one of the sub-slots in the first time slot; reserving a reception block for a second node that receives a transmission form the first node, wherein the reception block is offset from the transmission block by at least one sub-slot; and effecting the first node and second node to transmit and receive a data packet, respectively, according to a schedule based on the reserved transmission block and the reserved reception block. This exemplary embodiment or another exemplary embodiment may further provide effecting the second node to perform a different function during the sub-slot occurring prior to the beginning of the reception block. This exemplary embodiment or another exemplary embodiment may further provide effecting the first node to perform a different function during the sub-slot occurring subsequent to the end of the transmission block. This exemplary embodiment or another exemplary embodiment may further provide spanning the reception block across the first time slot and the second time slot. This exemplary embodiment or another exemplary embodiment may further provide offsetting the reception block by a number of sub-slots equal to a lowest integer differential of the time of flight (ToF) delay between the first node and the second node. This exemplary embodiment or another exemplary embodiment may further provide setting the size of the plurality of sub-slots prior to the first node transmitting the data packet to the second node. This exemplary embodiment or another exemplary embodiment may further provide fragmenting a reservation block into at least a first block fragment and a second block fragment; scheduling the first block fragment over a first period of sub-slots; and scheduling the second block fragment over a second period of sub-slots that are spaced by at least one sub-slot from the first period of sub-slots.

In yet another aspect, an exemplary embodiment of the present disclosure may provide a method comprising: requesting a reservation for transmission of data packet from a first node to a second node; determining whether quality of service (QoS) is maintained, wherein if QoS is not maintained then returning a failure; wherein if QoS is maintained, then determining whether there is sufficient space for the reservation, wherein if there is sufficient space, then making the reservation; wherein if there is insufficient space, then splitting the reservation into two parts; determining whether there is sufficient space for one of the two parts, and if there is insufficient space for one of the two parts, then returning a failure; wherein if there is sufficient space for one of the two parts, then adding a first reservation; determining whether there is sufficient space for the other of the two parts, wherein if there is sufficient space, then adding the reservation for the other of the two parts and if there is insufficient space, then returning a partial failure indicating that the first reservation was confirmed but there was insufficient space for the other of the two parts.

In yet another aspect, an exemplary embodiment of the present disclosure may provide an asynchronous medium access control layer scheduler that increases efficiency for directional mesh networks by removing extra overhead in the time slots. The efficiency is increased by dividing time slots into sub-slots to allow for a receiving node to be offset by at least one sub-slot from the transmitting node. This enables the scheduler to more efficiently schedule operations for the nodes so that nodes can be performing other functions rather than waiting to receive a transmission or waiting after transmitting a transmission. The sub-slots may be sized to approximate the transmission propagation time or time of flight delay.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 2A (FIG. 2A) is a table diagram of a transmission/schedule formed from a conventional scheduler.

FIG. 2B (FIG. 2B) is a table diagram of a transmission/schedule formed from an asynchronous medium access control layer (AMAC) scheduler of the present disclosure accounting for time of flight of the transmitted signal.

FIG. 4A (FIG. 4A) is a table diagram of a transmission/schedule formed from the conventional scheduler.

FIG. 4B (FIG. 4B) is a table diagram of a transmission/schedule formed from the AMAC scheduler of the present disclosure that fragments longer transmission between multiple spaced apart sub-slots.

Similar numbers refer to similar parts throughout the drawings.

DETAILED DESCRIPTION

Figure 1:
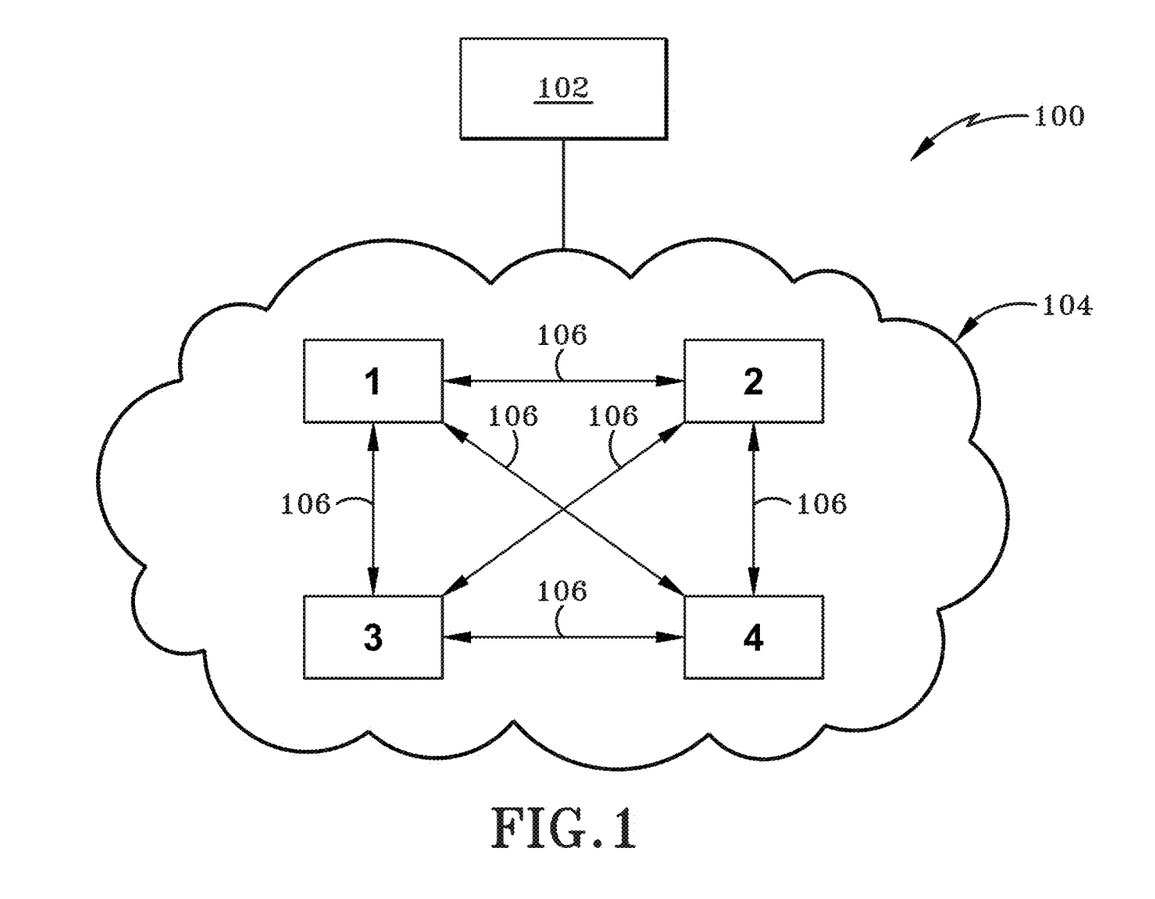
FIG. 1 (FIG. 1) is a schematic view of a plurality of directional nodes in a mesh network.

FIG. 1 schematically depicts a system 100 having an asynchronous medium access control (AMAC) scheduler 102 coupled with a directional mesh network 104 formed from a plurality of directional antennas or nodes that are coupled together to transmit and receive information there between. Namely, there is a first directional antenna or node 1, a second directional antenna or node 2, a third directional antenna or node 3, and a fourth directional antenna or node 4. While four antenna or nodes are shown, it is to be understood that the number of antenna may vary depending on the application and operational needs of the system. Each node or antenna is, at least indirectly, coupled with the AMAC scheduler 102. The AMAC scheduler 102 coordinates transmissions and receptions of data across transmission links 106 in the mesh network 104. The mesh network 104 refers to a network in which all nodes that are within range of each other are in operative communication. As will be described in greater detail below, the AMAC scheduler 102 takes advantage of and accounts for signal/transmission time of flight (ToF) delay, which may also be known as propagation delay, to more efficiently schedule transmission between nodes in the mesh network 104. The AMAC scheduler 102 may include a device to account for the ToF delay. The AMAC scheduler 102 appears to be particularly advantageous when the nodes are directional antennas.

FIG. 2A depicts a table diagram of a conventional scheduler for nodes in a directional network. The table depicts that there are three slots (represented by columns) of equal width that correspond to a time period. For example, each time slot may be on the order of milliseconds or seconds. Further there are four nodes, wherein each node is represented by a row in the table. Namely, the first node 1, the second node 2, the third node 3 and the fourth node 4. Node 1 transmits to the second node 2 and the second node 2 receives the transmission from first node 1. The transmission and reception of the nodes 1, 2 begin at the same time and end at the same time, which corresponds to the vertical edges of the first slot (i.e., slot 1).

With continued reference to FIG. 2A, the conventional scheduler must account for the transmission of data between the first node to the second node 2 in the entire slot. However, the scheduler includes within the first time slot the amount of time that first node 1 is sending information along the link and the amount of time that antenna is receiving along the link, as well as the time to propagate or "time of flight" (ToF) delay from one node to the other. The time to propagate or ToF delay is considered to be a form of "overhead" that reduces the efficiency of the system. Namely, the system must account for the amount of time that it takes for the first node 1 to generate the data, the longest amount of time the data takes to propagate (for any contemplated link), and the amount of time it takes the second node 2 to receive the data. The farther two nodes are away from each other requires a greater ToF delay which results in lower amount of time to transmit the nodes have to transmit/receive during the time slot. The worst case (largest) potential size for ToF must be allocated in the slot structure for it to be usable by all nodes in all contemplated situations. Thus, the traditional scheduler has some built in inefficiency.

FIG. 2B is a table diagram of the AMAC scheduler 102 in accordance with the present disclosure which provides for asynchronous scheduling. The AMAC scheduler 102 takes advantage of offset transmissions and reception between the transmitter and the receiver, respectively. The offset enables a time frame or period in which the free receiver or transmitter may be performing another function instead of waiting for its partner. In one particular embodiment, the AMAC scheduler 102 is implemented as instructions, programs, or other software that is stored on at least one non-transitory computer readable storage medium and is executed by a processor. However, other embodiments envision an AMAC scheduler 102 has a separate hardware component or a combination of hardware and software that schedules transmissions and receptions between directional antennas in the mesh network 104.

The scheduling table of the AMAC scheduler 102 includes a plurality of time slots including at least a first time slot and a second time slot. Generally, there are at least two sub-slots within the first time slot and the second time slot. Generally, there is a transmit packet block or reservation occupying the first time slot and the two sub-slots within the first time slot; and a receiver packet block or reservation independent from the transmit packet block/reservation, the receiver packet block/reservation occupying at least one sub-slot from the first time slot and at least one sub-slot from the second time slot that is adapted to free the node, in this case node 2, (i.e., a transceiver) during the other sub-slot in the first time slot to perform a different operation and node 1 during sub-slot 4 for other operations while the transmitted packet is still being received.

As stated previously, the AMAC scheduler 102 divides the time slots from a conventional scheduler into sub-slots. Namely, there may be anywhere from two to twenty sub-slots for one time slot. In this particular example, the AMAC scheduler 102 of FIG. 2B provides four sub-slots for every time slot. The number of sub-slots within a time slot may vary across differing embodiments depending on the application and/or operational needs of the system. According to one particular embodiment, the number of sub-slots per slot would be preset prior to executing or populating the table schedule of the AMAC scheduler 102. Namely, the first time slot has four sub-slots 1-4, the second time slot has four sub-slots 5-8, and the third time slot has four sub-slots 9-12.

The AMAC scheduler 102 accounts for the propagation time or ToF delay that it takes for the information to transmit through a medium (typically air) from the transmitter node 1 to the receiver node 2. By accounting for the propagation time or ToF delay, the total amount of time allocated for the transmission is reduced from the first example (FIG. 2A). Namely, the transmitter packet block/reservation for node 1 need only transmit from sub-slot 1 to sub-slot 3 within the first time slot, which corresponds to 75% of the first time slot (i.e., a 25% reduction from a conventional scheduler). Further, the AMAC scheduler 102 shifts or offsets the receiver packet block/reservation for node 2 by at least one-sub slot. More particularly, the AMAC scheduler 102 offsets the receiver packet block/reservation for node 2 by the ToF delay. As such, the receiver packet block/reservation for node 2 occupies sub-slot 2 through sub-slot 4 of the first time slot. Thus, receiver packet block/reservation for node 2 also occupies 75% of the first time slot and the first 25% of the first time slot (i.e., sub-slot 1) is a free period in which the second node 2 could be scheduled to perform a different function than receiving the transmission from the first node 1.

According to an exemplary aspect of the present disclosure, an exemplary feature of the AMAC scheduler 102 is to reduce or eliminate the time associated with transmitters or receivers "waiting" on the other during the propagation time or ToF delay. The AMAC scheduler 102 increases efficiently by eliminating the need for the nodes to "schedule in" (i.e., account for) the ToF delay by dividing the time slots into sub-slots and offsetting the scheduled reception time from the schedule transmission time, wherein the offset is equal to the ToF delay. Thus, once transmitter node 1 begins its transmission, the receiver node 2 will not start its scheduled reception until after an amount of time corresponding to the ToF delay has passed. Note that if there is uncertainty in the value of the ToF, the receiver may schedule to start listening earlier to account for the uncertainty and schedule time beyond the length of the packet for the same reason. But generally, this frees up the receiver node 2 to perform a different function during this initial sub-slot worth of time (i.e., sub-slot 1 in FIG. 2B).

According to one embodiment, the ToF delay may be empirically determined prior to scheduling the transmissions/receptions between the nodes in the AMAC scheduler 102. The ToF delay may be determined by sending control messages between the nodes 1-4 or directional antennas in the network 104. Then the time stamps associated with the control messages may be determined and compared. This comparison will yield the propagation time or ToF delay between the transmitting node and the receiving node. Then, once the ToF delay has been calculated, the AMAC scheduler can be programmed to determine how many sub-slots are needed for a given application. Then, once the number of sub-slots are determined, the appropriate sub-slot offset can be scheduled between the first node 1 and the second node 2 to offset the receiving node from the transmitting node.

The size or number of the sub-slots may vary depending on application needs. For example, the number of sub-slots per time slot can be changed based on accuracy or resolution required for the system. In this example, the control messages and comparison determination may determine that the propagation time from the first node 1 to the second node 2 is 100 ms. Then, the scheduler may determine that the system 100 desires a one-sub-slot resolution offset such that a sub-slot needs to be equal to 80 ms. The amount of sub-slots that the receiving node 2 would need to be offset would be determined by dividing the ToF delay by the sub-slot size and taking the integer floor. Stated otherwise 100 ms/80 ms=1.2, and taking the integer floor equals 1. Stated otherwise, the ToF delay is rounded to the lowest integer of sub-slot worth of time. Thus, the second node 2 is offset by one sub-slot from the transmission schedule of the first node. The second node 2 would then be able to perform another operation in the free sub-slot. Additional sub-slots at the end of the packet block may also be scheduled to account for packet blocks overlapping multiple sub-slot on reception, and also uncertainty in the ToF value.

Figure 3A:
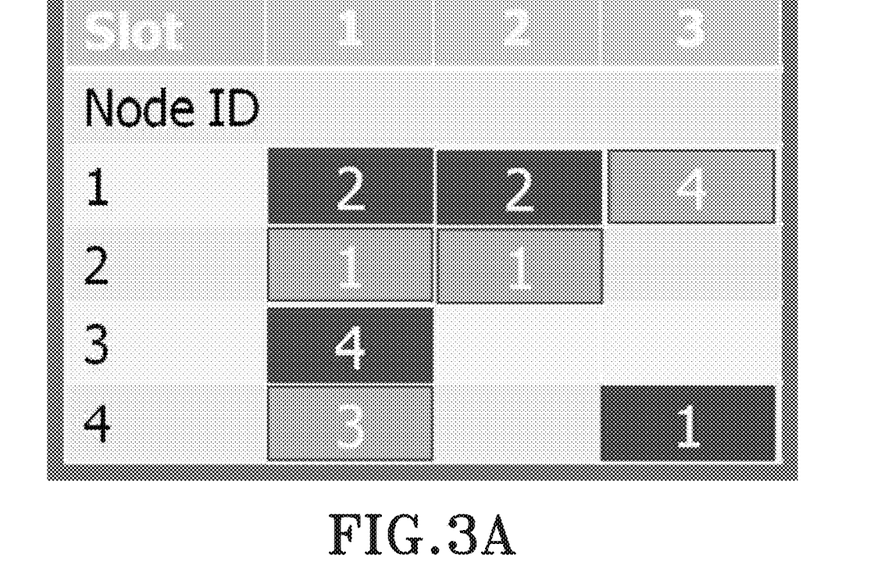
FIG. 3A (FIG. 3A) is a table diagram of a transmission/schedule formed from the conventional scheduler.
Figure 3B:
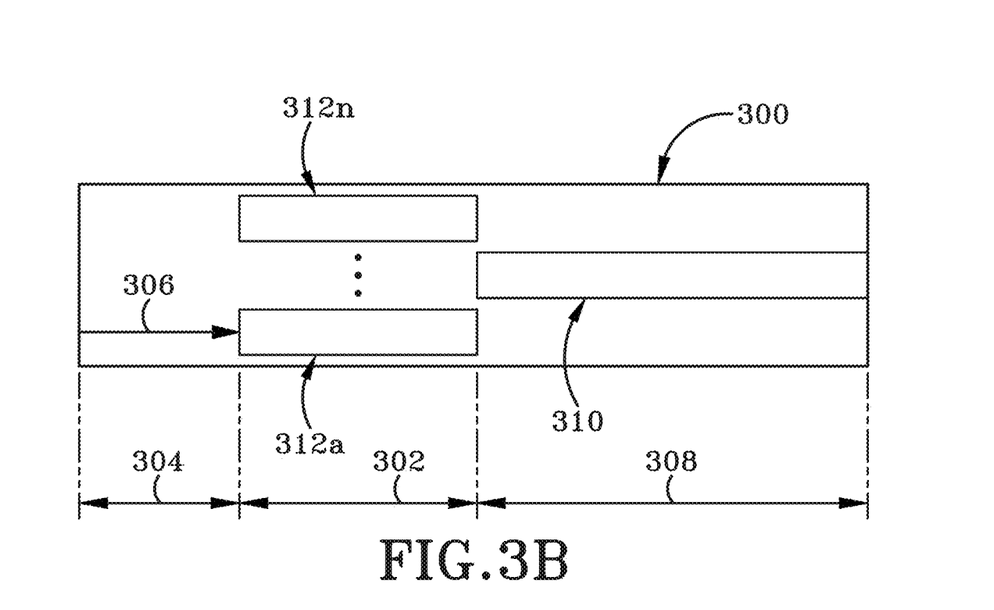
FIG. 3B (FIG. 3B) is an exemplary slot structure.
Figure 3C:
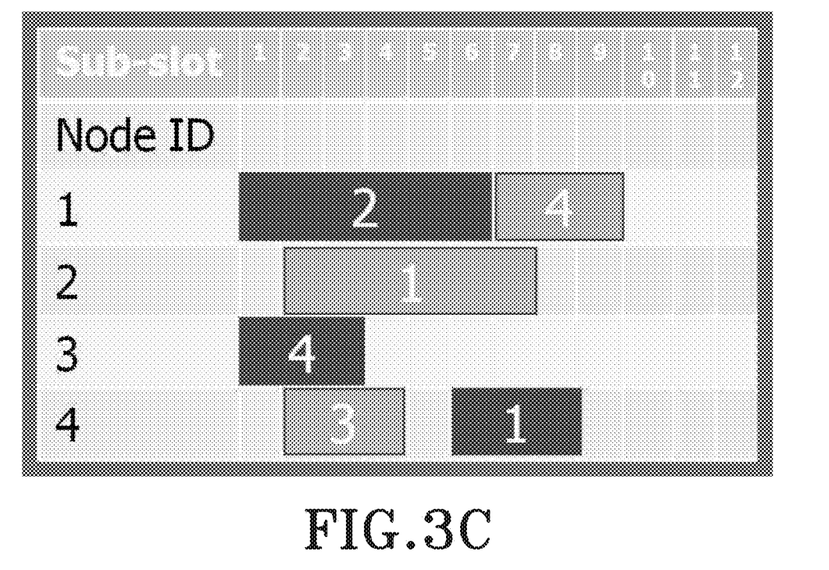
FIG. 3C (FIG. 3C) is a table diagram of a transmission/schedule formed from the AMAC scheduler of the present disclosure to increase transmission/reception efficiency.

FIG. 3A and FIG. 3C are representative to indicate an efficiency increase from a conventional scheduler (FIG. 3A) to the AMAC scheduler 102 (FIG. 3C) of the present disclosure while FIG. 3B shows an exemplary slot structure. As indicated previously, the AMAC scheduler 102 has sub-slots that are shorter time periods within a standard time slot ordinarily present in a conventional scheduler. The sub-slots allow for more efficient use of the scheduler. The examples identified in FIG. 3A and FIG. 3C depict how the total used space of transmissions/receptions between directional nodes in the mesh network 104 drop from 66% in the conventional scheduler (FIG. 3A) to 50% in the AMAC scheduler (FIG. 3C) of the present disclosure.

FIG. 3A represents that the conventional scheduler produces a schedule with reservations that occupy eight of the possible twelve time slots (8/12=66%). The first node 1 is transmitting during the first two time slots and the second node 2 is receiving during the first two times slots. Similar to what has been stated previously, some of the transmission/reception time within the first two time slots for the node 1 and node 2 accounts for the propagation time or ToF delay in transmitting data from node 1 to node 2 across the link 106. Node 3 is transmitting during the first time slot and node 4 is receiving during the first time slot. Similarly, the transmission/reception between node 3 and node 4 incorporate the propagation time between the nodes across the link. Node 3 and node 4 are idle during the second time slot. Node 4 is transmitting during the third time slot to the receiving node 1 in the third time slot. Node 2 and Node 3 are idle during the third time slot.

FIG. 3A further depicts a noteworthy setback of conventional schedulers. When a node needs to transmit data over a period of time that is greater than the period of one time slot, it is required to align to time slots immediately adjacent each other. However, the time slots are independent and the data transmission/reception cannot span the two time slots. Rather, there is a distinct break between the adjacent disparate/distinct time slots. Particularly, it is seen that node 1 has been scheduled to transmit to node 2 in the first time slot and the second time slot. The first time slot is independent from the second time slot. Thus, each time slot includes ToF delay time for the signal transmitting between node 1 and node 2 with the first time slot and within the second time slot. Stated otherwise, node 1 transmits information in the first time slot but must terminate its transmission prior to the end of the first time slot to ensure that there is enough space in the first time slot for node 2 to properly receive all of the information within the first time slot. Additionally, in the second time slot, node 1 transmits information in the second time slot but must terminate its transmission prior to the end of the second time slot to ensure that there is enough space in the second time slot for node 2 to properly receive all of the information within the second time slot.

To further illustrate this point, FIG. 3B represents an exemplary slot construction 300. Several different constructions for slots are possible that leverage known aspects of the operational topology. In this case, it is known that the time to transmit a given message 302, plus any antenna switching time 304, that is any required settling time, etc. or offset delay 306, is shorter than the time 308 of the ToF 310. Because of this, it is possible for all terminals to transmit a message 312a, 312n, and then reconfigure during the ToF 310 to receive HAIL message 312a, 312n, from other terminals in the same slot 300. Normally this is only true at low elevations and long ranges. Note that since the look direction for receive is complementary to the look direction for transmit (in two dimensions they would be 180 degrees apart), it is possible for many terminals to receive and transmit at the same time. This slot structure would also be used to support such cases.

Further, as there may be a same size slot per each node 302, one may subtract the start time to get a common zero, and thus the offset is predetermined and optimized throughout the nodes. The protocol has a certain time size 302 which is the size of the message 702. However, at times the distances can get so long that the ToF 310 can be longer than the rate of transfer. As a result, there may be a lot of dead time, and in order to be the most efficient the most time must be optimized. If it is known that the time of the ToF 308 is long, then at some time there needs to be both listening and transmitting, as a node is unable to do both. If every node is transmitting and then switches to receive at the same time, when nodes are far apart from one another, the ToF 310 allows for a delay between transmitting and receiving. In certain protocols there is significant down time for discovery as all potential nodes could hear each other at the same time, or a substantially identical time.

FIG. 3C represents an exemplary scheduling table for the AMAC scheduler 102 of the present invention which offsets or shifts the transmission and reception schedules across sub-slots spanning multiple time slots to increase efficiency in the transmission/reception of data between nodes. The AMAC scheduler 102 enables the scheduling of transmissions and receptions between nodes that span otherwise disparate/distinct time slots in order to increase efficiency.

FIG. 3C provides that the AMAC scheduler 102 has divided each time slot into four sub-slots. Node 1 transmits to node 2 but the AMAC scheduler enables the transmission schedule to span from the first time slot to the second time slot without interrupting the transmission schedule/reservation to account for ToF delay, as was required in FIG. 3A. Node 1 occupies sub-slots 1-6 which is a 25% reduction in the amount of time that was previously required under FIG. 3A, which corresponds to occupying all of the first time slot and all of the second time slot (i.e., the amount of time in sub-slots 1-8).

With continued reference to FIG. 3C, the reception scheduled at node 2 is offset by one sub-slot from the transmission at node 1. Namely, node 2 occupies sub-slots 2-7. The transmission scheduled at Node 3 occupies sub-slots 1-3 and to the reception of that transmission at node 4 occupies sub-slots 2-4. Thus, receiving node 4 is offset by one sub-slot from transmitting node 3. Then, node 4 can be used to transmit to node 1. Node 4 can transmit in sub-slots 6-8 and node 1 can receive in sub-slots 7-9. This example shows that the sub-slots in the free schedule space associated with the three time slots is greatly increased for other transmission to occur. Namely, within the third time slot of the conventional schedule of FIG. 3A, only 50% of the space in the third time slot was free (i.e., nodes 1,4 were occupied and nodes 2,3 were idle/free). However, using the AMAC scheduler of the present disclosure, the third time slot is now 93.75% free inasmuch as 15 of the 16 sub-slots in the third time slot were free/idle. There was an approximate 100% increase in the amount of free space in the third time slot compared to the conventional scheduler. The extra free space can be utilized to schedule other transmission that were previously unavailable, thus increasing the efficiency of directional node transmissions through the use of the AMAC schedule with sub-slots in each respective time slot.

FIG. 4A and FIG. 4B depict fragmentation advantages of the AMAC scheduler 102 compared to the conventional scheduler. The AMAC scheduler 102 can split up reservations over multiple slots or sub-slots if there is not enough room to fit the reservation in one block of slots or sub-slots.

FIG. 4A depicts a traditional schedule in which a two slot (eight sub-slot) reservation between node 1 and node 3 from the first time slot to the fourth time slot is not possible as the necessary slots are already reserved by node 2 and node 4.

More particularly, node 1 is transmitting to node 2 during the first time slot and the second time slot. Node 1 is receiving from node 4 during the third time slot and the fourth time slot. During this schedule, node 3 remains idle the entire time as there is no corresponding timeframe or slot in which node 3 could interact with node 1. However, it is noted that node 3 could be scheduled to interact with node 4 during the first and second time slots and node 3 could be scheduled to interact with node 2 during the third and fourth time slots. However, it is not possible to add a two slot reservation for node 1 to the transmission/reception schedule using a conventional scheduler.

FIG. 4B depicts a fragmentation technique of the AMAC scheduler 102 that would allow a two slot (eight sub-slot) reservation in the space from the first time slot to the fourth time slot. Fragmentation refers to having a significant amount of data that would require or reserve multiple time slots. In this instance the data may be fragmented such that the long signal is split into fragments over multiple sub-slots.

FIG. 4B provides an exemplary schedule to increase efficiency by enabling node 3 and node 1 to schedule a transmission link by fragmenting the packet block with the two slot (eight sub-slot) window into two four sub-slot blocks spaced from each other. Namely, node 1 transmits in sub-slots 1-4 and node 2 receives the transmission in sub-slots 2-5. Node 4 transmits in sub-slots 8-11 and node 1 receives in sub-slots 9-12. Thus, node 1 is free to receive transmissions in sub-slots 5-8 and sub-slots 13-16. The AMAC scheduler fragments the transmission from Node 3 so as to transmit in sub-slots 4-7 and sub-slots 12-15 which correspond to reception periods of node 1 in sub-slots 5-8 and sub-slots 13-16, respectively. This enables the efficiency of the transmission between nodes 3 and 1 to increase from 0% to about 50% since before none of the time at node 3 could be used and now about 8 of 16 blocks are being used.

Figure 5:
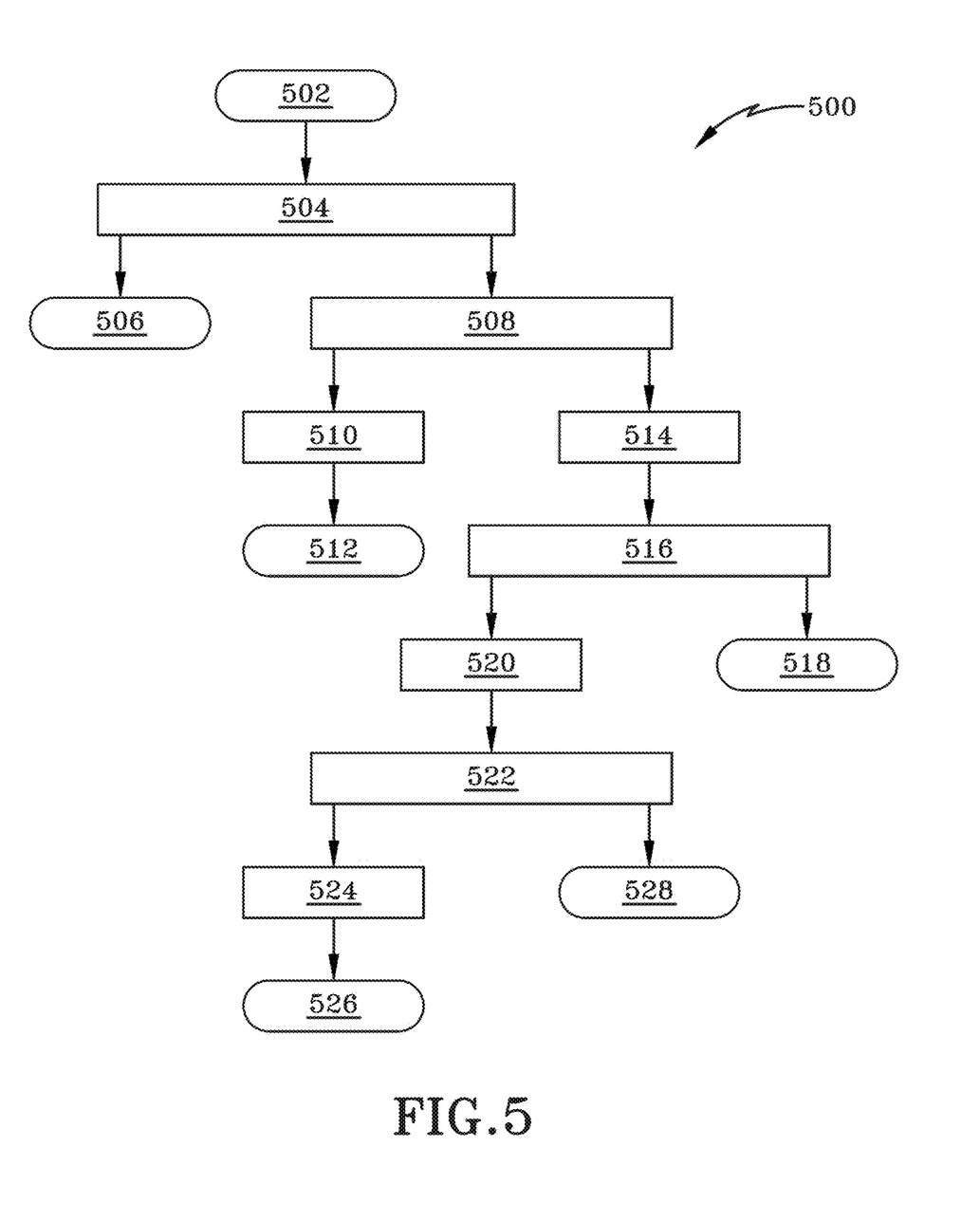
FIG. 5 (FIG. 5) is a flow chart depicting an exemplary method or process for the AMAC in accordance with one aspect of the present disclosure.

FIG. 5 depicts a flow chart in accordance with an exemplary method of the present disclosure generally at 500. The flowchart of method 500 is a reservation process that is accomplished and/or performed at every node. Note that the method is a "scheduling discipline" that may be combined with other scheduling disciplines as would be understood by those skilled in the art. The method 500 will be described with respect to node 1, however, it is to be understood that it is equally applicable to any of the other nodes within the network. Node 1 receives data or a reservation request of information that node 1 desires to transmit to another node in the network, such node 4, which is shown generally at 502. Thus, node 1 is aware that it needs to make a reservation request to another node, such as node 4, in the network 104. Then, this node (i.e., node 1) starts the process for the reservation request because it has data that it needs to transmit to the other node. Subsequent to the reservation request at 502, the first node 1 must ensure that quality of service (QoS) will be maintained, which is shown in general at 504. QoS refers to a threshold to ensure that the amount of data that one node sends to another does not occupy a significant portion of the bandwidth or transmit time availability between the two nodes. QoS relates to maintaining transmission below a preset threshold so as to allow other nodes to communicate within the operating schedule. Stated otherwise, the system does not want the first node to take up the entire schedule of the fourth node. This is because if the first node occupies much of the fourth node schedule, then no other nodes within the network will be able to talk or communicate or transmit to the fourth node. This is advantageous as there will be high priority data that needs to be exchanged between various nodes in the network. Thus, the method 500 ensures that every node has an opportunity to connect with other nodes within the network, if needed. Thus, QoS ensures that every node has an opportunity, if needed, to transmit data to another node within the network 104. Subsequent to ensuring QoS is being maintained at 504, if it is determined that QoS is unable to be maintained then method 500 returns a failure, which is shown at 506. For example, if node 1 is attempting to make a reservation from node 1 to node 4, and method 500 determines that node 1 is already transmitting above a certain time threshold, such as 50%, 60% 70%, 80% or 90% of the available time for node 4, then the system will return a failure to prevent additional information from transmitting from the first node to the fourth node because QoS cannot be maintained for other nodes within the network. Threshold is a configurable variable that may range depending on application specific needs. However, it is envisioned that the threshold will be in a range from about 50% of the reservation time availability to about 90% thereof.

If it is determined that QoS is able to be maintained at 504, then the method 500 determines whether there is sufficient space for the reservation, which is shown generally at 508. A separate set of connectivity is assumed for control purposes as would be understood by those skilled in the art. The control connections with surrounding nodes is used to share existing schedule for transmit and receives between nodes. In this particular implementation, node 1 has a copy of its own schedule when it's transmitting and when it's receiving as well as a copy of node 4's schedule. Thus, as shown in FIG. 2B, FIG. 3C, and FIG. 4B, the AMAC schedule tables would be available to each node within the network 104. Thus, there is a processor that determines the row of node 1 and its available sub-slots with the available sub-slots from the row of node 4 is then determined how much contiguous space is available. For example, if there are five sub-slots in a row that is free at node 1, then the processor checks and determines whether there is a corresponding five available sub-slots in node 4 to receive the information transmitted from node 1 accounting for the time of flight delay with the offset. For example, if the processor determines that sub-slots 1-4 are available for the first node 1 and the time of flight delay is equal to one sub-slot, then the processor needs to determine whether sub-slots 2-5 are open and available for node 4 (four sub-slots offset by one). If the method 500 or processor determine that there is sufficient space for the reservation, then the system makes the reservation, which is shown generally at 510, and a return success is provided, which is shown generally at 512. If there is insufficient space at 508, then a determination is made to split the reservation into two parts (which may be two equal parts; i.e., half), which is shown generally at 514. Then, the process is somewhat repeated inasmuch as the method 500 or its processor determines whether there is enough space for the first half of the reservation that was previously split in two at 514, which is shown generally at 516. Thus, in this example, the method 500 would determine whether there is a sufficient amount of space for two sub-slots in first node 1 and whether there are two available sub-slots in node 4 offset by one sub-slot. Thus, the method may determine whether sub-slots one or two are available for node 1 and whether sub-slots two or three are available for node 4. If there is not sufficient space for the first half of the reservation, then the system determines there is an insufficient space and it returns a failure, which is shown generally at 518 and no further action is taken or applied.

When the failure is returned at 518, nothing is added and no reservation is added to either schedule.

If there is enough space for half the reservation, then the first half of the reservation is added, which is shown generally at 520. Then, the first half of the reservation added at 520 is inserted into the schedule. The method 500 or its processor then determines whether there is a sufficient amount of space for the second half of the reservation that was split at 516, which is shown generally at 522. Then, the method 500 or its processor determines whether there is a second half availability for two continuous sub-slots or any number of sub-slots corresponding to the size of the second half of the reservation. In this particular example, the system determines whether sub-slots, such as sub-slots 9 and 10, are available for the first node and whether sub-slots 10 and 11 are available for node 4. If there is sufficient space for the second half of the reservation, then the second half reservation is added, which is shown generally at 524 and a return success is provided, which is shown generally at 526. If there is insufficient space for the second half reservation, then a partial failure is returned, which is shown generally at 528. A partial failure is returned at 528 because the first half of the reservation was added at 520 and the system or method 500 is still able to transmit half the amount of data that was added at 520. The other half that was returned as a partial failure will have to wait until another further time to be transmitted. Thus, the method 500 enables as much information to be transmitted as possible by splitting the reservation in half, at least one time, to ensure that at least some data is transmitted between the nodes. Other variations on this technique are also possible, where the largest available amount of schedule time between two nodes is determined, and that much is transmitted with the remainder being reserved for a future transmission. Also, there may be uncertainty in the exact ToF between two nodes, and there will be a certain amount of overhead from the physical layer, which may also transmit at different rates to different nodes. The specific number of sub-slots required for a transmission would account for these factors and possibly others.

While examples discussed herein were made with reference generally to nodes, and in some embodiments the nodes may be directional antennas. However, it is to be understood that AMAC scheduler 102 would also operate in conjunction with nodes that are omni-directional antennas. In such cases the scheduler would account for the receive and transmit schedules of all nodes within its vicinity rather than just a single node. Further there may be a framing approach that includes different scheduling disciplines for discovery, Control, Data, and multicast. The AMAC would most likely be applied as the scheduling discipline for the data within the frame.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone may be utilized to execute the software code or instructions of the AMAC scheduler via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. An asynchronous medium access control (AMAC) scheduler comprising:
   at least one time slot including a first time slot;
   at least two sub-slots within each at least one time slot;
   a transmit packet block occupying at least one sub-slot within the first time slot; and
   a receiver packet block including at least one sub-slot independent from the transmit packet block of at least one sub-slot, both the transmit packet block and the receiver packet block occupying at least one sub-slot and the receiver packet block being offset by a non-negative integer value of sub-slots from the transmit packet block from the first time slot and at least one sub-slot from a second time slot that is adapted to free a transceiver during the other sub-slot in the first time slot to perform a different operation;
   wherein a ratio of sub-slots to slots is in a range from 2:1 to 20:1.

2. The AMAC scheduler of claim 1, further comprising:
   a device to account for the time of flight (ToF) delay from the transmit packet block to the receiver packet block.

3. The AMAC scheduler of claim 1, further comprising:
   a transmitter node and receiver node wherein the receiver node performs a different task in a prior sub-slot during the ToF delay before the at least one sub-slot from the first time slot.

4. The AMAC scheduler of claim 1, wherein the ToF delay is at least equal to the time of one sub-slot.

5. The AMAC scheduler of claim 1, further comprising:
   a time slot splitter that splits the first time slot into the at least two sub-slots and splits a second time slot into the at least two sub-slots; and
   wherein the number of sub-slots for the first time slot is in a range from two sub-slots to about twenty sub-slots.

6. The AMAC scheduler of claim 5, wherein the number of sub-slots in the first time slot is equal to four.

7. The AMAC scheduler of claim 1, wherein the non-negative integer value is equal to a lowest integer differential of a time of flight (ToF) delay between a first node and a second node.

8. The AMAC scheduler of claim 1, wherein the ratio of sub-slots to slots is 4:1.

9. The AMAC scheduler of claim 1, further comprising a mesh network having a first directional antenna that transmits a packet and a second directional antenna that receives the packet, wherein the mesh network is in operative communication with the AMAC scheduler.

10. The AMAC scheduler of claim 1, further comprising:
    a first fragmented packet block and a second fragmented packet block spaced from the first fragmented packet block by at least one sub-slot.

11. A method comprising:
    dividing a first time slot in a node scheduler into a plurality of sub-slots and a second time slot into a plurality of sub-slots;
    reserving a transmission block for a first node within at least one of the sub-slots in the first time slot;
    reserving a reception block for a second node that receives a transmission from the first node, wherein the reception block is offset from the transmission block by at least one sub-slot;
    effecting the first node and second node to transmit and receive a data packet, respectively, according to a schedule based on the reserved transmission block and the reserved reception block; and offsetting the reception block by a number of sub-slots equal to a lowest integer differential of the time of flight (ToF) delay between the first node and the second node.

12. The method of claim 11, further comprising:

effecting the second node to perform a different function during the sub-slot occurring prior to the beginning of the reception block.

13. The method of claim 11, further comprising:

effecting the first node to perform a different function during the sub-slot occurring subsequent to the end of the transmission block.

14. The method of claim 11, further comprising:

setting the size of the plurality of sub-slots prior to the first node transmitting the data packet to the second node.

15. The method of claim 11, further comprising:

fragmenting a reservation block into at least a first block fragment and a second block fragment;

scheduling the first block fragment over a first period of sub-slots; and scheduling the second block fragment over a second period of sub-slots that are spaced by at least on sub-slot from the first period of sub-slots.

16. A computer program product including one or more non-transitory computer readable mediums encoded with instructions that when executed by one or more processors cause a process to be carried out for scheduling reception of radio signals, the process comprising:

dividing a first time slot in a node scheduler into a plurality of sub-slots and a second time slot into a plurality of sub-slots;

reserving a transmission block for a first node within at least one of the sub-slots in the first time slot;

reserving a reception block for a second node that receives a transmission from the first node, wherein the reception block is offset from the transmission block by at least one sub-slot;

effecting the first node and second node to transmit and receive a data packet, respectively, according to a schedule based on the reserved transmission block and the reserved reception block; and offsetting the reception block by a number of sub-slots equal to a lowest integer differential of the time of flight (ToF) delay between the first node and the second node.

17. The computer program of claim 16, further comprising:

fragmenting a reservation block into at least a first block fragment and a second block fragment;

scheduling the first block fragment over a first period of sub-slots; and scheduling the second block fragment over a second period of sub-slots that are spaced by at least on sub-slot from the first period of sub-slots.

* * * * *